Sept. 1, 1953 K. C. ALLISON 2,650,960
ROTARY ELECTRIC SWITCH ASSEMBLY
Filed June 4, 1952
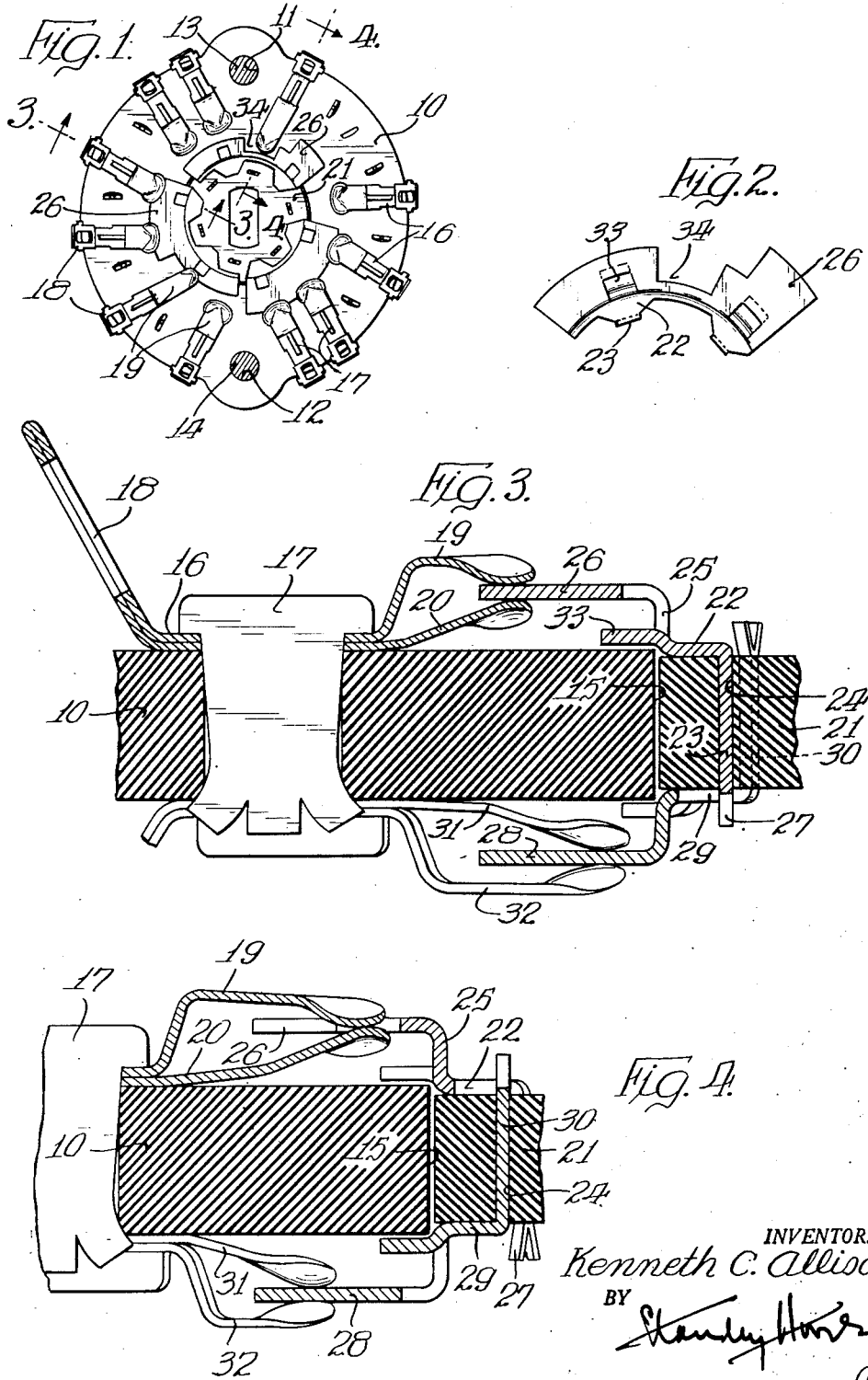
INVENTOR.
Kenneth C. Allison
BY
Atty.

Patented Sept. 1, 1953

2,650,960

UNITED STATES PATENT OFFICE 2,650,960

ROTARY ELECTRIC SWITCH ASSEMBLY

Kenneth C. Allison, Crystal Lake, Ill., assignor to Grigsby-Allison Company, Inc., Arlington Heights, Ill., a corporation of Delaware Application June 4, 1952, Serial No. 291,750

6 Claims. (Cl. 200—15)

This invention relates to new and improved means for supporting the rotor assembly in rotary electrical switches of the type wherein contact blades mounted on a rotor have engagement respectively with contact clips on a stator whereby circuits may be selectively established between such stator contacts through operation of the rotor about its axis.

In switches of this type it is desirable to provide for slight adjustment of the rotor without imposing a strain on the cooperating rotor and stator contacts which taxes the elasticity of such contacts. To this end the present invention contemplates a rotor contact body of such design and construction as to provide a blade portion for engagement with the stator clips and an integral tab or lug removed from the blade portion for sliding engagement with the face of the stator about the rotor containing opening. Thus the present invention provides a rotor supporting feature that is particularly applicable to rotary switches wherein it is desirable to have rotor contacts on opposite sides of a single rotor disk by direct fastening of said contacts on said disk. It is also an advantage in the construction and assembly of a rotary switch of a type wherein it is desired to by-pass a stator contact otherwise engaged by the rotor contacts of minimum radial length and to accomplish such by-pass without breaking the continuity of the rotor contact member opposite said stator contact.

With these and other objects in view, the present invention consists in the construction, arrangement and combination of the various elements whereby the objects contemplated are attained, as hereinafter more fully set forth, pointed out in the appended claims and illustrated in the accompanying drawings, wherein:

Fig. 1 is a plan view of a rotary switch embodying rotor supporting means in accordance with the present invention.

Fig. 2 is an enlarged detail view of the rotor contact member appearing at the upper edge of the rotor as shown in Fig. 1.

Fig. 3 is an enlarged fragmentary sectional view taken on line 3—3 of Fig. 1, to illustrate the arrangement of rotor and stator contacts on opposite sides of the switch section shown in Fig. 1.

Fig. 4 is a similar sectional view taken on line 4—4 of Fig. 1.

In the drawings, the present invention is shown as applied to a rotary switch having a stator plate 10 of phenolic sheet or other suitable insulating material. The stator 10 is preferably of circular plan having suitable apertures at diametrically opposite sides thereof for entry of spacing devices 13 and 14 which are adapted to cooperate with similar stators to support a series in gang switch relation as is common in switches of this type. The stator 10 is further provided with a central opening presenting an edge portion 15. Each face of the stator 10 has a series of stator clips arranged thereon in spaced apart relation circumferentially of the stator and in radially extending relation to said central opening. Each stator clip comprises a strip of metal folded intermediate its ends to provide a two-ply central portion 16 which is penetrated by a suitable fastening member 17 anchored in a suitable opening formed in the underlying portion of the stator. The folded end of the stator clip, which extends away from the central opening of the stator in the form of an outwardly and upwardly inclined tail 18 provides a connecting end to which circuit wires may be readily soldered or otherwise secured. At the opposite end, the two thicknesses of the stator clip are separated to form resilient jaws 19 and 20 which are so spaced away from the face of the stator 10 opposite thereto as to present meeting faces in a plane axially removed from the stator.

As shown in Fig. 1, certain of the stator clips are of lesser radial dimension than others. This variation is determined according to the circuit combinations it is desired to provide with the rotor contacts which will be hereinafter more particularly described.

Contained within the central opening of the stator 10 and of such peripheral contour as to have free turning travel within the area defined by the edge 15 of said opening in the stator is a rotor disk 21 of phenolic sheet or other suitable insulating material. As shown in Figs. 3 and 4, the rotor contact member associated with the face of the rotor disk 21 which is uppermost comprises a flat base portion 22 which engages the underlying surface of the disk 21. Two or more of said base portions 22 may be connected, as shown in Fig. 2, so as to combine to form a ring or segment of a ring according to the circuit requirements of the particular switch. Each base portion 22 has an angularly bent finger extending from the innermost edge thereof, said finger, designated by the reference numeral 23, being anchored in a suitable slot 24 formed in the rotor disk 21 by staking as at 27 against the face of the disk opposite the face engaged by the base portion 22. An upstanding flange 25 forming an extension of said base portion 22 in the direction of the stator 10 provides a junction between said base portion 22 and a radially projecting blade portion 26 adapted to be engaged between the jaws 19 and 20 of the stator clips. Thus as the rotor disk 21 is turned the blade portion 26 is moved in a rotary path between selected jaws of the stator clips.

Similar blade portions 28 forming part of rotor contact members having base portions 29 secured by fingers 30 against the opposite face of the rotor disk 21 likewise cooperate with stator contact clips 31 and 32 on the face of the stator overlapped by said blade portions 28.

In order to allow for slight adjustment of the rotor disk 21 within selected limits lengthwise of the axis about which said rotor disk turns and without taxing the elasticity of the cooperating stator clips and rotor contact blades, the rotor is supported against movement beyond such limits by means independent of said cooperating contacts. As shown in Fig. 3, such means includes a tab or lug 33 which is sheared and bent radially outwardly from the flange portion 25 of the rotor contact body, said tab or lug engaging the face of the stator 10 about the rotor receiving opening. Such tab 33 accordingly cooperates with a similar tab formed integrally with the corresponding flange portion of the rotor contact body of which the blade 28 on the opposite side of the rotor disk 21 is formed, to provide positive stops engageable with the cooperating face portions of the stator to limit movement of the rotor disk 21 within fixed distances axially of the rotor so as to avoid undue strain on the cooperating stator and rotor contacts.

In addition to the advantages thus gained in the protection of the stator and rotor contacts from such strain, the provision of such tabs 33 affords a construction wherein it is possible to bypass a stator clip of such length as to otherwise be engaged by the rotor contact and to provide such by-pass without interrupting the continuity of the rotor contact body. For example as shown in Figs. 1 and 2, the contact member so provided with rotor supporting tabs 33 may have a gap 34 in the blade portion so that the clips 19 and 20 on the stator may be by-passed as shown in Fig. 4 without loss of adequate support for the rotor disk in the area opposite said gap 34. Accordingly in circuit combinations wherein it is desired to by-pass the stator clips without loss of continuity of circuit between the blade portions 26 of the rotor contact member on opposite sides of said gap 34, the tab 33 supplies the needed rotor support.

What is claimed is:

1. A rotary electric switch comprising a stator of insulating material having a central opening, contacts carried by said stator and extending therefrom in spaced apart relation circumferentially of the stator, each of said stator contacts presenting a pair of resilient jaws opening toward but extending a distance short of said central opening in straddling relation to a common plane in spaced parallel relation to the surface of the stator from which said contacts extend, a rotor of insulating material contained in said opening for rotation therein and having a contact member fixed thereto, an integral blade extending from said contact member with which the jaws of a selected stator contact are engageable in a selected rotated position of the rotor, and means operative to restrict movement of the rotor relative to the stator within a selected range axially of the rotor including a member formed integrally with and extending from said rotor contact member in spaced relation to the plane of the blade for sliding engagement with the surface of the stator.

2. A rotary electric switch as defined in claim 1 wherein said blade forms an extension of an upstanding flange joining the blade to the portion of the rotor contact member fixed to the rotor, and said member of the means operative to restrict movement of the rotor relative to the stator within a selected range axially of the rotor constitutes a tab sheared from and bent away from said upstanding flange.

3. A rotary electric switch comprising a stator of insulating material having a central opening, each face of the stator having contacts fixed thereto and extending therefrom in spaced apart relation circumferentially of the stator, each of said stator contacts common to one face of the stator presenting a pair of resilient jaws opening toward but extending a distance short of said central opening in straddling relation to a common plane in spaced parallel relation to said latter face of the stator, and each of said stator contacts common to the other face of the stator presenting a pair of similar jaws opening in straddling relation to a common plane in spaced parallel relation to said other face of the stator, a rotor of insulating material contained in said opening for rotation therein, each face of the rotor having a contact member fixed thereto independently of a similar contact member fixed to the other face thereof, an integral blade extending from each contact member on said rotor for engagement with the jaws of a selected stator contact in alignment therewith in a selected rotated position of the rotor, and means operative to restrict movement of the rotor relative to the stator within a selected range axially of the rotor including a member formed integrally with and extending from a contact member on one face of the rotor in spaced relation to the plane of the blade of said contact member for sliding engagement with the surface of the stator, and a similar member formed integrally with and extending from the contact member on the other face of the rotor for sliding engagement with the opposite surface of the stator.

4. A rotary electric switch as defined in claim 3 wherein the blade of each contact member forms an extension of an upstanding flange joining said blade to the portion of the rotor contact member fixed to the rotor, and said members of the means operative to restrict movement of the rotor relative to the stator within a selected range axially of the rotor constitutes a tab sheared from and bent away from said upstanding flange of each contact member.

5. A rotary electric switch as defined in claim 1 wherein said blade extending from said contact member has a portion engageable by stator contact other than said selected stator contact but adapted to avoid engagement with said selected stator contact.

6. A rotary electric switch as defined in claim 1 wherein said blade extending from said contact member has a portion engageable by a stator contact other than said selected stator contact but adapted to avoid engagement with said selected stator contact, said portion being so isolated from the blade with which the jaws of said selected stator contact are engageable as to maintain the contact member from which said blade extends in a state of complete separation from said selected stator contact when the rotor is in a rotated position wherein said selected stator contact is located centrally of said portion and said blade.

KENNETH C. ALLISON.

No references cited.